July 4, 1933.  R. W. ALEXANDER  1,916,710
STRAINING ATTACHMENT FOR PANS AND KETTLES
Filed June 11, 1931
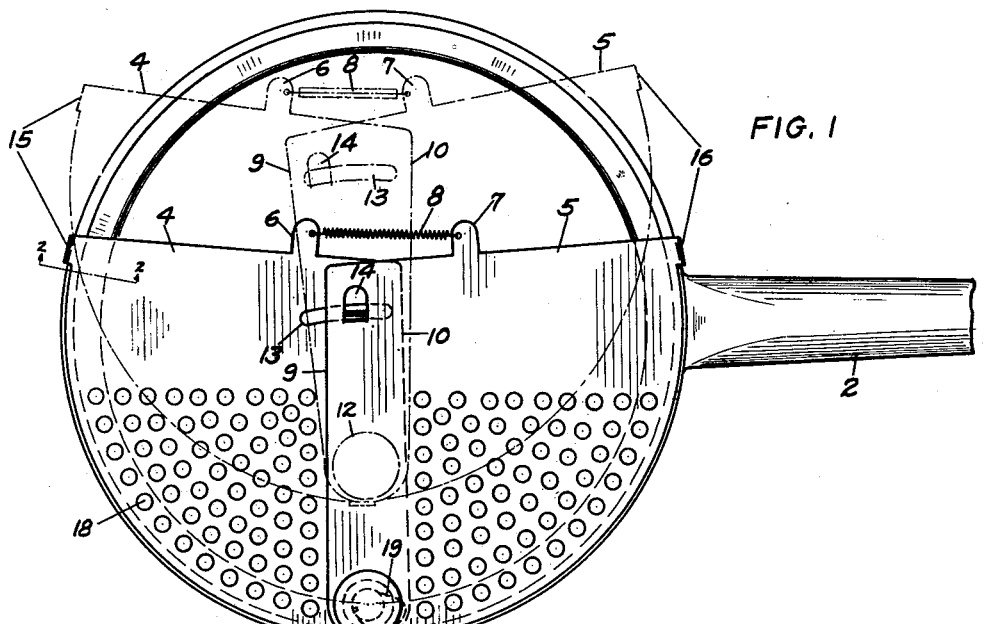
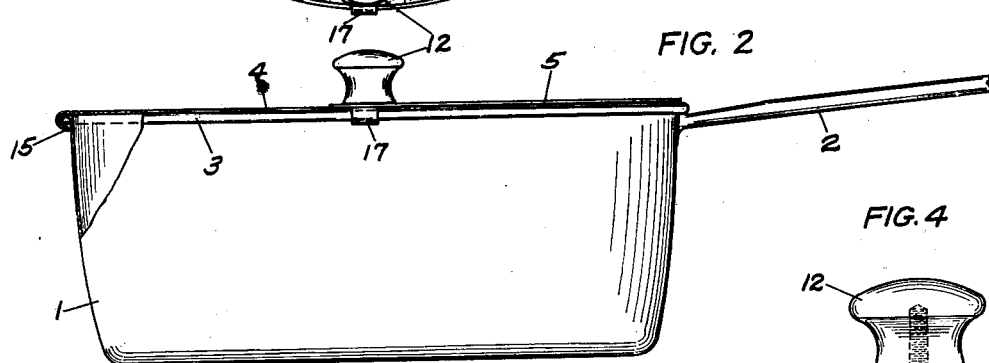
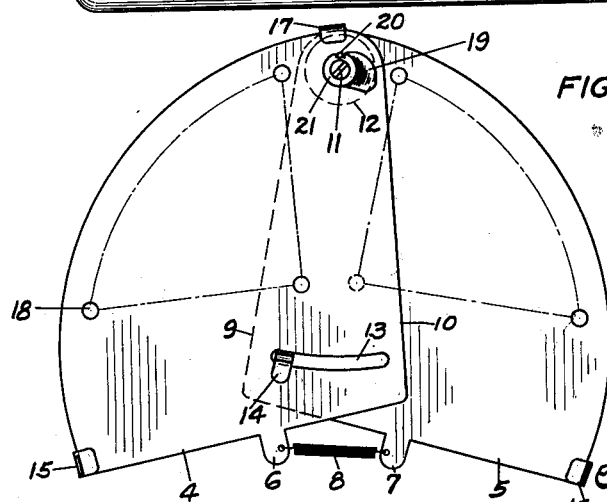
Inventor
ROY W. ALEXANDER
Attorney Patented July 4, 1933

1,916,710

UNITED STATES PATENT OFFICE

ROY W. ALEXANDER, OF NEWARK, NEW JERSEY

STRAINING ATTACHMENT FOR PANS AND KETTLES

Application filed June 11, 1931. Serial No. 543,583.

This invention relates to improvements in attachment covers to be applied to pans, kettles, and the like for the purpose of retaining vegetables within the containers while the water is being drained off.

While the vegetables are being cooked, it is usual to use an imperforate cover on the vessel containing the vegetables, and after these are cooked, the cover is taken off and my attachment can then be put in place to perform the function mentioned above.

In my Patent 1,781,995, issued November 18, 1930, I have shown and described one form of straining attachment, but by further use and experiments with this attachment, I have discovered how it may be greatly improved and the cost of manufacture made cheaper.

Hence, the principal object of my present invention is to provide a straining attachment which is cheaper to manufacture and one which may be more quickly substituted for the regular cover used in cooking the vegetables, and which is more readily adaptable, than the attachment of my patent above referred to, to containers of varying sizes within limits.

My present improvement will be easily understood by reference to the annexed drawing wherein:

Figure 1 is a plan view on a reduced scale, of a pan such as is ordinarily used in cooking vegetables, showing my attachment applied thereto in full lines. The dotted lines indicate the position of the attachment as it is about to be applied to the pan.

Figure 2 is a side elevation of the pan showing the attachment in place, one corner of the pan being broken away to show one of the clips for holding the attachment in place.

Figure 3 is a bottom view of the straining attachment.

Figure 4 is a part-sectional view and side elevation of the handle portion of the attachment, showing how the same may be locked in position on the pan.

Referring now to the details wherein like numbers refer to corresponding parts in the various views, 1 illustrates a pan having a handle 2 and a turned-over or re-enforcing rim 3. The straining attachment is in the form of a segmental disk, preferably somewhat larger than the semi-circular area of the top of the pan, composed of two sector-shaped pieces 4 and 5 of any suitable material such as aluminum.

The sector 4 is provided with a lug 6, and the sector 5, with a lug 7, and a spring 8 attached to the lugs 6 and 7, normally acts to hold the sectors 4 and 5 in overlapping relationship, as indicated by the broken lines 9 and 10, it being understood that the two sectors 4 and 5 are pivoted together by the pivot screw 11 which also serves to support a knob 12 used for manipulating the attachment. One of the sectors, for example 4, is provided with an arcuately positioned slot 13 which is adapted to receive a finger 14 punched downwardly out of the sector 5. The finger 14, after passing through the slot 13 is bent into overlapping relationship with the sector 4, thereby holding the sector 5 in guiding and operative position with respect to the sector 4. The sector 4 is also provided with a downwardly turned clip 15 which is adapted to hook over the rim 3 of the pan. Likewise, the sector 5 is provided with a hook-shaped clip 16 for engaging the rim 3 of the pan.

One of the sectors, preferably 4, is further provided with another clip 17, similar to clips 15 and 16, for engaging the rim 3 of the pan. The sectors 4 and 5 are provided with a plurality of perforations 18 through which the fluid may be drained from the vegetables after the attachment is put in place on the pan in the manner now to be described.

The attachment, having the sectors in the position shown by the broken lines in Figure 1, is placed over the top of the pan at about the position as indicated in Figure 1. The attachment is then pulled by the handle or knob 12 in a manner such that the clips 15 and 16 pass under the rim 3 of the pan, and as the clips engage the rim of the pan, the sectors 4 and 5 are spread apart to take their proper position on the top of the pan. The pull on the attachment is continued until the clip 17 can be passed over the rim of the pan, when a downward and inward push on the handle will cause the clip 17 to engage the rim of the pan, and the attachment takes the position about as indicated in Figure 1, it being understood that the attachment should be applied to the pan so that the clip 16 comes near one side of the handle 12 as indicated.

In order to lock the attachment securely on the pan, I preferably employ a cam-shaped device 19 which is carried under the head of the screw 11 and permanently anchored thereto in any satisfactory manner as by a lug 20 pressed out of the flanged head 21 of the screw 11 into a notch in the cam-shaped member 19. Preferably, the knob 12 has a mark thereon to indicate the position of the cam 19 when the attachment is being applied to the pan, after which the knob 12 is turned so as to bring the cam 19 into engagement with the inner side of the pan 3 as shown in Figure 4, thereby locking the attachment securely in position on the pan.

In removing the attachment, all that is required is to give the knob 12 a slight turn to release the cam 19, and an outward and upward pull to release the clip 17 from the rim, and the attachment may then be readily pushed off the pan to release the clips 15 and 16.

By the construction just described, I provide an attachment which can be readily applied with one hand, and one which will automatically find its seat on pans of different diameters within a given range, without the necessity of any manual adjustments, as is necessary in the attachment of my patent previously referred to, or other devices of prior art with which I am familiar.

Having thus described my invention, what I claim is:

1. A straining attachment for pans, kettles, and the like comprising two sector-shaped pieces having drain holes therein and pivoted together near the arcuate edge of the two sectors in movable overlapping relationship, means for assisting in holding and guiding the two sectors as they move one in respect to the other, a plurality of clips positioned on one side of said sectors for the purpose described, means for manipulating the attachment, and a spring connected between said sectors for automatically operating said sectors to adjust themselves about the pivot to allow the clips to engage the rim of the vessel to which the attachment is being applied.

2. A straining attachment for pans, kettles, and the like comprising two sector-shaped pieces having drain holes therein and pivoted together near the arcuate edge of the two sectors in overlapping relationship, one sector having a slot therein, the other sector having a finger projecting through said slot and overlapping the material of the sector adjacent the slot, a spring anchored to the sectors and normally holding the sectors so the finger is at one end of the slot, a plurality of clips positioned on one side of the sectors for the purpose described, and means for manipulating the attachment.

3. A straining attachment for pans, kettles, and the like comprising two sector-shaped pieces having drain holes therein and pivoted together near the arcuate edge of the two sectors in overlapping relationship, one sector having a slot therein, the other sector having a finger projecting through said slot and overlapping the material of the sector adjacent the slot, a spring anchored to the sectors and normally holding the sectors so the finger is at one end of the slot, a plurality of clips positioned on one side of the sectors for the purpose described, a knob positioned at the pivotal point for operating the attachment, and a cam-shaped member operable by the knob to engage the inner wall of the vessel and lock the attachment thereon.

In testimony whereof, I affix my signature.

ROY W. ALEXANDER.